Figure 1:
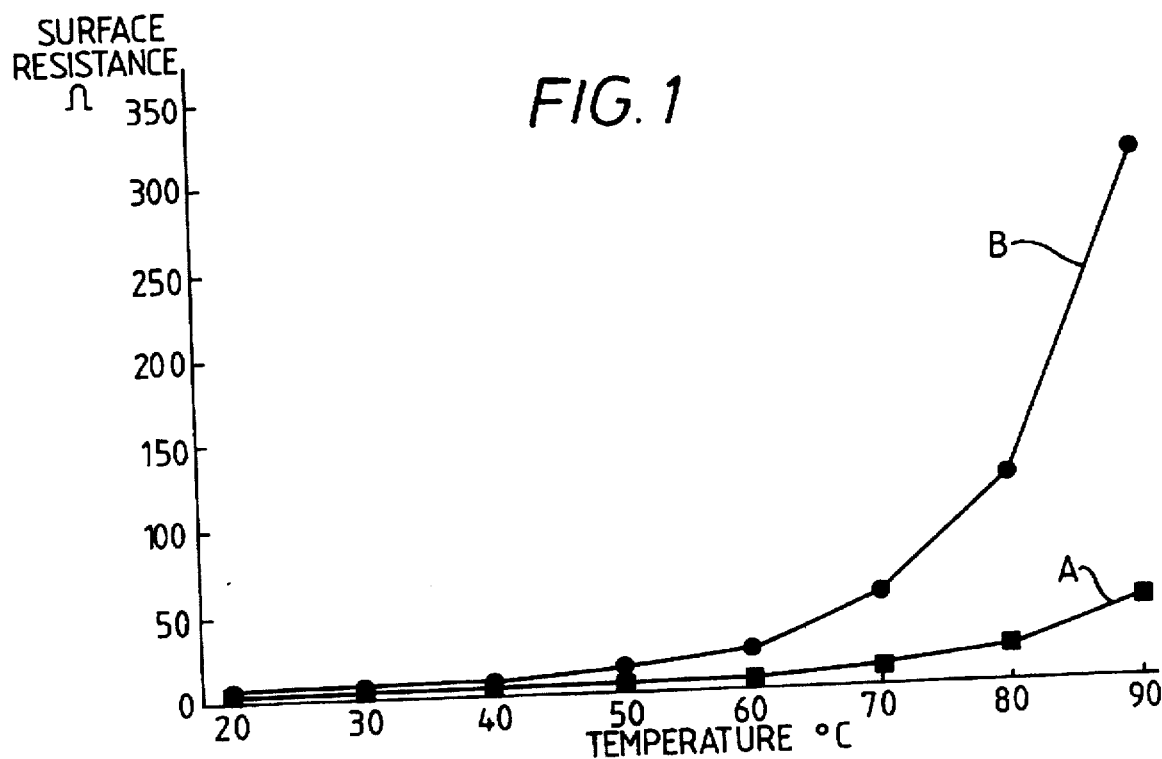

United States Patent [19]

Guilfoy et al.

[11] Patent Number: 5,705,555
[45] Date of Patent: Jan. 6, 1998

[54] CONDUCTIVE POLYMER COMPOSITIONS

[75] Inventors: Andrew Austin Guilfoy, Bacup, England; John Morris Funt, Nashua, N.H.

[73] Assignee: Cabot Corporation, Boston, Mass.

[21] Appl. No.: 575,808

[22] Filed: Dec. 22, 1995

(Under 37 CFR 1.47)

Related U.S. Application Data

[63] Continuation of Ser. No. 877,633, May 1, 1992, abandoned.

[30] Foreign Application Priority Data

May 4, 1991 [GB] United Kingdom ............... 9109856
Apr. 16, 1992 [EP] European Pat. Off. ............ 92303472

[51] Int. Cl.$^6$ ....................................................... C08K 3/00
[52] U.S. Cl. ........................... 524/495; 524/496; 252/511
[58] Field of Search .............................. 524/495, 496; 252/511

[56] References Cited

U.S. PATENT DOCUMENTS

| | | |
|---|---|---|
| 3,243,753 | 3/1966 | Kohler . |
| 4,387,046 | 6/1983 | Marsch et al. ............ 252/511 |
| 4,534,889 | 8/1985 | van Konynenburg et al. ....... 252/511 |
| 4,560,498 | 12/1985 | Horsma et al. ............ 252/511 |
| 5,093,036 | 3/1992 | Schafe et al. ............ 252/511 |

FOREIGN PATENT DOCUMENTS

| | | |
|---|---|---|
| 0110371 | 6/1984 | European Pat. Off. . |
| 60-124654 | 7/1985 | Japan . |
| 60-135441 | 7/1985 | Japan . |

OTHER PUBLICATIONS

J. Meyer, Glass Transition Temperature as a guide to selection of polymer Suitable for PTC materials, Polymer Engineering and Science, Nov. 1973, vol. 13, No. 6, pp. 462–468.
Chemical Abstracts, vol. 107, No. 6, Aug. 10, 1987, p. 109 Abstract No. 107: 41849e (Japan 62 27472).

Primary Examiner—Edward J. Cain

[57] ABSTRACT

A conductive polymer composition having PTC characteristics comprising a polymer matrix, constituting from 20 to 98 percent by weight of the composition, throughout which is dispersed a mixture of conductive carbon blacks constituting from 2 to 80 percent by weight of the composition, the mixture comprising a first conductive carbon black and a second conductive carbon black, each of the carbon blacks having a structure level, as measured by DBP technique, of 40 to 150 cc/100 g and each constitutes from 1 to 40 percent by weight of the composition, the first carbon black comprising particles having average size in the range from 35 to 300 nm and the second carbon black comprising particles having average size in the range from 15 to 25 nm.

7 Claims, 2 Drawing Sheets

CONDUCTIVE POLYMER COMPOSITIONS

This is a continuation of application Ser. No. 07/877,633 filed May 1, 1992 now abandoned.

BACKGROUND OF THE INVENTION

1. Field of the Invention

The present invention is directed to conductive polymer compositions having positive temperature coefficient characteristics.

2. Description of the Related Art

Conductive polymer compositions are known which comprise a polymer or a mixture of polymers throughout which is dispersed a powder comprising conductive particles. Commonly the powder is carbon black.

It has been known for some years that some conductive polymer compositions comprising conductive carbon black dispersed in a polymer or a mixture of polymers exhibit a positive temperature coefficient of resistance which itself increases with temperature in a discontinuous manner so that the compositions have characteristics akin to a semiconductor. For example, the resistance may increase quite slowly with increase of temperature below a certain level, called the critical temperature, but above that critical temperature level there is a rapid increase of resistance. Indeed, the increase may be so rapid that the composition becomes effectively non-conducting at temperatures above the critical temperature. This phenomenon is described, for example, in U.S. Pat. No. 3,243,753, which describes an electrical resistor in the form of a plastic e.g. a thermoplastic or suitable thermosetting material, preferably a polyolefin plastic, containing a finely divided conductive powder, preferably carbon black, intimately dispersed through the plastic matrix. In that patent it is suggested that below the critical temperature there is particle-to-particle contact throughout the composition, which thus has a relatively low resistance. Above the critical temperature, however, the substantial difference between the thermal coefficients of expansion of the conductive particles and the plastic results in breaking down the contact between the particles, with resultant sharply increased resistivity. U.S. Pat. No. 4,560,498, however, refers to other theories which have been proposed to account for the positive temperature coefficient (PTC) phenomenon, including complex mechanisms based upon electron tunnelling though inter-grain gaps between particles of conductive filler or some mechanism based upon a phase change from crystalline to amorphous regions in the polymer matrix. The Specification refers to a discussion of a number of theories in "Glass Transition Temperatures as a Guide to the Selection of Polymers Suitable for PTC Materials" by J. Meyer in *Polymer Engineering and Science*, November, 1973, Vol. 13, No. 6.

According to U.S. Pat. No. 4,560,498, known PTC materials generally comprise one or more conductive fillers such as carbon black or powdered metal dispersed in a crystalline thermoplastic polymer. According to the Specification, such known PTC materials are unreliable and either do not provide the sharply increased resistance which is intended at the critical temperature or have a variable critical temperature, particularly over a number of cycles. Such unreliability has also been noted by the present inventor.

Japanese Patent Application No. Sho 60-124654 discloses an electroconductive resin composite comprising ingredients (a) to (c), with an amount of (a) in the range of 96 to 50 parts by weight with respect to (a+b), an amount of (b) in the range of 4 to 50 parts by weight with respect to (a+b), and an amount of (c) in the range of 10 to 100 parts by weight with respect to 100 parts by weight of (b), where (a) is a thermoplastic resin, (b) is a carbon black with BET specific surface area larger than 850 m²/g and (c) is a carbon black with BET specific surface area smaller than 100 m²/g. One or more inert filler(s) may also be added. The composites are said to have excellent electroconductivity, moulding processability, mechanical properties and moulding appearance.

Japanese Patent Application No. Sho 60-135441 discloses a semiconductor resin composite made of ethylene-series polymer with added electroconductive carbon black and heat-conductive carbon black with particle size larger than that of said electroconductive carbon black. The amount of heat-conductive carbon black may be 5 to 20 parts by weight with respect to 100 parts by weight of the polymer. It is said that such a type of semiconductor resin can realize easily any desired electrical resistance in the range of $10^3$ to $10^6$ ohms/cm.

SUMMARY OF THE INVENTION

According to this invention, a conductive polymer composition having positive temperature coefficient characteristics comprises at least one polymer providing a matrix throughout which is dispersed a mixture of conductive carbon blacks each having a structure level, as measured by DBP technique, of 40 to 150 cc/100 g, the polymer matrix constituting from 20 to 98 percent by weight of the composition, and the mixture constituting from 2 to 80 percent by weight of the composition and comprising a first conductive carbon black and a second conductive carbon black, each of the carbon blacks constituting 1 to 40 percent by weight of the composition, the first carbon black comprising particles having average size m in the range from 35 to 300 nm and the second carbon black comprising particles having average size in the range from 15 to 25 nm.

It is preferred that the composition be composed of from 40 to 80 percent by weight of polymer and from 20 to 60 percent by weight of the mixture of carbon blacks. Most preferred is a composition comprising 52 to 72 percent by weight of polymer and 28 to 48 percent by weight of the mixture.

Preferably the first and second carbon blacks are both of the kind commonly called "furnace" blacks, produced by the well-known furnace process rather than by other known methods such as the channel, or thermal, process.

Any polymer may be used in producing the conductive polymer composition of the invention. It is preferred, however, that the polymer utilized be thermoplastic, such as polyethylene, ethylene vinyl acetate, polypropylene, polyamide, polyethylene terephthalate or polyethersulphone.

Surprisingly, the use of a mixture of first and second carbon blacks as described has been found to produce conductive polymer compositions with PTC characteristics having electrical properties which are substantially more reliable than prior compositions, as evidenced by repeatability of these characteristics over many cycles of heating and cooling above end below the critical temperature. Moreover, the compositions have critical temperatures which are significantly less variable then those of prior art compositions and exhibit a sharper change in the rate of change of resistance with temperature around the critical temperature then is noted for normal PTC compositions utilizing one carbon black.

Conductive polymer compositions as described may be formed into electrical elements to exploit the electrical properties mentioned. For example, the elements may be resistors, heaters or sensors or the like.

The conductive polymer compositions of the invention may also be utilized in the preparation of conductive ink formulations. This is achieved by mixing any suitable transient carriers with the conductive polymer compositions of the invention along with any conventional additive.

The conductive polymer compositions of the invention are readily prepared by mechanical methods. The polymer or polymers and the carbon blacks may be admixed on a conventional mixing machine of the type normally used for mixing rubber or plastics such as a mill roll, an extruder or a Banbury mixer. The mixture produced by the machine may be formed by moulding or extrusion into electrical elements as mentioned or it may be formed into pellets which may be used subsequently in extrusion or moulding equipment.

The critical temperature in a conductive polymer having PTC characteristics depends to some extent upon the size end shape of the polymer element and the manner in which current connections are made. If the current connections are on one surface of a polymer element, the current is mainly conducted through a thin surface fill, commonly called "planar" conduction, which may produce higher critical temperatures than if the connections are made at opposite ends of a polymer element. In the letter case the conduction, commonly called "bulk" conduction, is more or less uniformly through the body of the element. For polymer elements of a uniform size and shape produced from compositions as described which exhibit PTC characteristics, it has been found that the critical temperatures depend largely upon the particular polymer or polymers which are present.

The invention will be understood more readily by reference to the following examples. There are many other forms of the invention, as will be obvious to one skilled in the art once the invention has been fully disclosed. It will accordingly be recognized that these examples are only given for the purpose of illustration and are not to be construed as limiting the scope of the invention in any way.

The following testing procedures are used in the determination of the properties of the carbon blacks utilized in the preparation of the conductive polymer compositions of the invention and in the determination of the physical properties of the novel conductive polymer compositions:

B.E.T. Surface Area—ASTM D 3037.

Particle Size—ASTM D 3849.

DBP Absorption—ASTM D 2414.

Surface Resistance—DIN 53482.

In preparing the formulations of the following examples which are illustrative of the invention, the carbon blacks shown in the following Table 1 have been utilized. The blacks shown in Table 1 are typical of the carbon blacks which may be utilized in the invention.

EXAMPLES 1–6

EFFECT OF POLYMER COMPOSITION ON CRITICAL TEMPERATURE

Examples 1 to 6 comprised mixtures as shown in the following Table 2.

TABLE 2

| EXAMPLE NUMBERS: Ingredients | 1 | 2 | 3 | 4 | 5 | 6 |
|---|---|---|---|---|---|---|
| | Percentages by Weight | | | | | |
| First Conductive Carbon Black (Ref. 1) | 20 | 20 | 20 | 20 | 20 | 20 |
| Second Conductive Carbon Black (Ref. 2) | 20 | 20 | 20 | 20 | 20 | 20 |
| EVA copolymer 1 (18% Vinyl Acetate) | 60 | | | | | |
| Polyethylene | | 60 | | | | |
| Polypropylene | | | 60 | | | |
| Polyamide 6,6 | | | | 60 | | |
| Polyethylene terephthalate | | | | | 60 | |
| Polyethersulphone | | | | | | 60 |
| Critical temperature (°C.) | 80 | 90 | 132 | 160 | 275 | 350 |

Critical Temperature is the temperature at which the Positive Temperature Coefficient (PTC) Factor equals 10. The PTC Factor at any temperature is the surface resistance at that temperature divided by the surface resistance at 20° C.

Table 2 shows that different polymers, when used with the same carbon blacks to produce conductive polymer compositions according to the invention, produce different critical temperatures.

EXAMPLES 7–12

EFFECT OF CARBON BLACK CONCENTRATION ON PTC CHARACTERISTICS

Examples 7 to 12 comprised mixtures as shown in the following Table 3.

TABLE 3

| EXAMPLE NUMBERS: Ingredients | 7 | 8 | 9 | 10 | 11 | 12 |
|---|---|---|---|---|---|---|
| | Percentages by Weight | | | | | |
| First Conductive Carbon Black (Ref. 1) | 22 | 20 | 18 | 18 | 17 | 16 |
| Second Conductive Carbon Black (Ref. 2) | 22 | 20 | 18 | 18 | 17 | 16 |
| EVA copolymer 1 (18% Vinyl Acetate) | 56 | 60 | 64 | 64 | 66 | 68 |
| Critical temperature (°C.) | 81 | 80 | 64 | 61 | 58 | 55 |

Table 3 shows that changing the proportions of the carbon black components can affect the critical temperature of conductive polymer compositions according to the

TABLE 1

SUITABLE TYPES OF CONDUCTIVE CARBON BLACK

| CARBON BLACK REF. | SURFACE AREA m²/g (ASTM D 3037) | PARTICLE SIZE nm (ASTM D 3849) | DBP ABSORPTION cc/100 g (ASTM D 2414) | PROCESS OF PREPARATION |
|---|---|---|---|---|
| 1 | 140 | 20 | 116 | Furnace |
| 2 | 42 | 41 | 120 | Furnace |
| 3 | 30 | 60 | 64 | Furnace |
| 4 | 230 | 15 | 65 | Furnace |
| 5 | 25 | 75 | 64 | Furnace |
| 6 | 7* | 148 | 41 | Thermal |
| 7 | 220 | 16 | 105 | Furnace |

*Determined by ASTM D 1510.

invention, but the effects are less severe than those produced by changing the polymer base, as shown in Table 2. The difference in critical temperature between Examples 9 and 10 is typical of differences obtained due to variations in dispersion during manufacture and in measurement accuracy.

EXAMPLES 13 to 19

EFFECT OF CARBON BLACK PARTICLE SIZE ON PTC CHARACTERISTICS

Examples 13 to 19 comprised mixtures as shown in the following Table 4. Their PTC Factors at various temperatures are shown in Table 5.

TABLE 4

| EXAMPLE NUMBERS | | 13 | 14 | 15 | 16 | 17 | 18 | 19 |
|---|---|---|---|---|---|---|---|---|
| Ingredients | | Percentages by Weight | | | | | | |
| CARBON BLACK REFERENCE | PARTICLE SIZE | | | | | | | |
| 1 | 20 | 20 | 20 | 20 | | | | |
| 2 | 41 | 20 | | | | | | |
| 3 | 60 | | | 20 | | | | |
| 4 | 15 | | | | 20 | 20 | | |
| 5 | 75 | | | | 20 | | 20 | |
| 6 | 148 | | | | | 20 | 20 | 20 |
| 7 | 16 | | | | | | 20 | 20 |
| EVA Copolymer 1 | | 60 | 60 | 60 | 60 | 60 | 60 | 60 |

TABLE 5

| | TEMPERATURES (°C.) | | | | | | | |
|---|---|---|---|---|---|---|---|---|
| EXAMPLE NUMBER | 30 | 40 | 50 | 60 | 70 | 80 | 90 | 100 |
| | | | | | PTC FACTOR | | | |
| 13 | 1.4 | 1.8 | 2.5 | 3.6 | 6.8 | 16 | 188 | 318 |
| 14 | 1.5 | 1.8 | 2.7 | 4.8 | 12 | 41 | 171 | 518 |
| 15 | 1.3 | 1.7 | 2.1 | 2.7 | 4.0 | 6.0 | 8.2 | |
| 16 | 1.6 | 2.7 | 4.0 | 10.5 | 25 | 31 | 3330 | 3882 |
| 17 | 1.3 | 1.6 | 2.0 | 2.4 | 3.1 | 6.1 | 4.8 | |
| 18 | 1.4 | 1.7 | 2.4 | 3.3 | 5.4 | 12.2 | 22 | |
| 19 | 1.3 | 1.7 | 2.2 | 3.2 | 4.7 | 9.7 | 12.6 | |

Table 5 shows how the PTC characteristics of the compositions can be varied over a very wide range by changing the particle sizes of the carbon blacks used.

Figure 2:
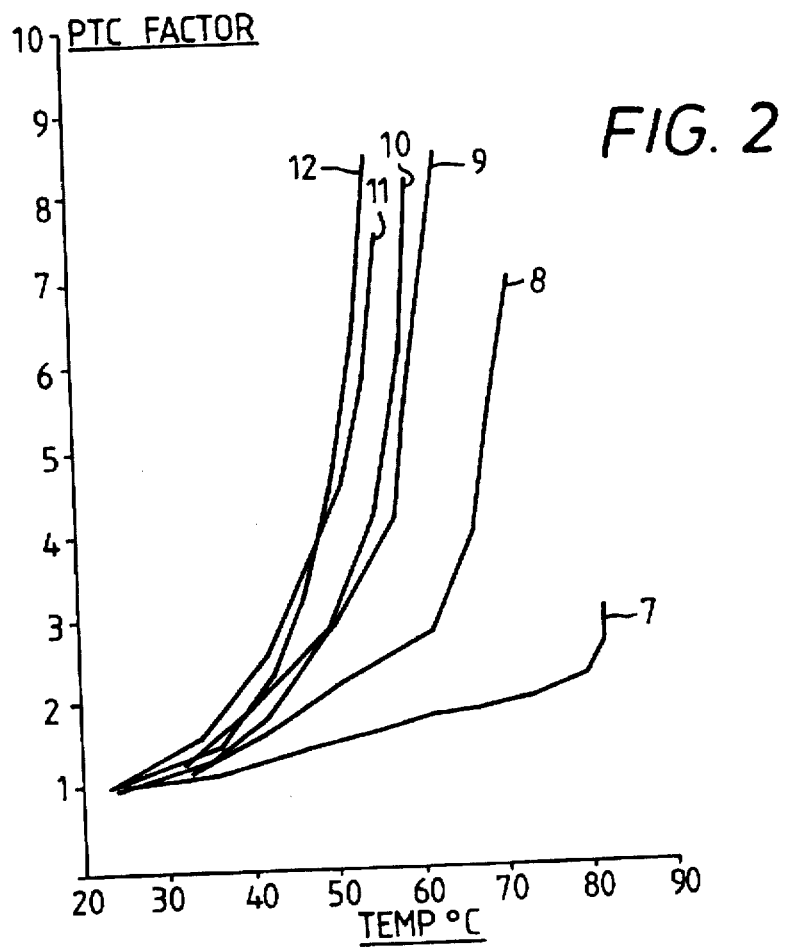
Figure 3:
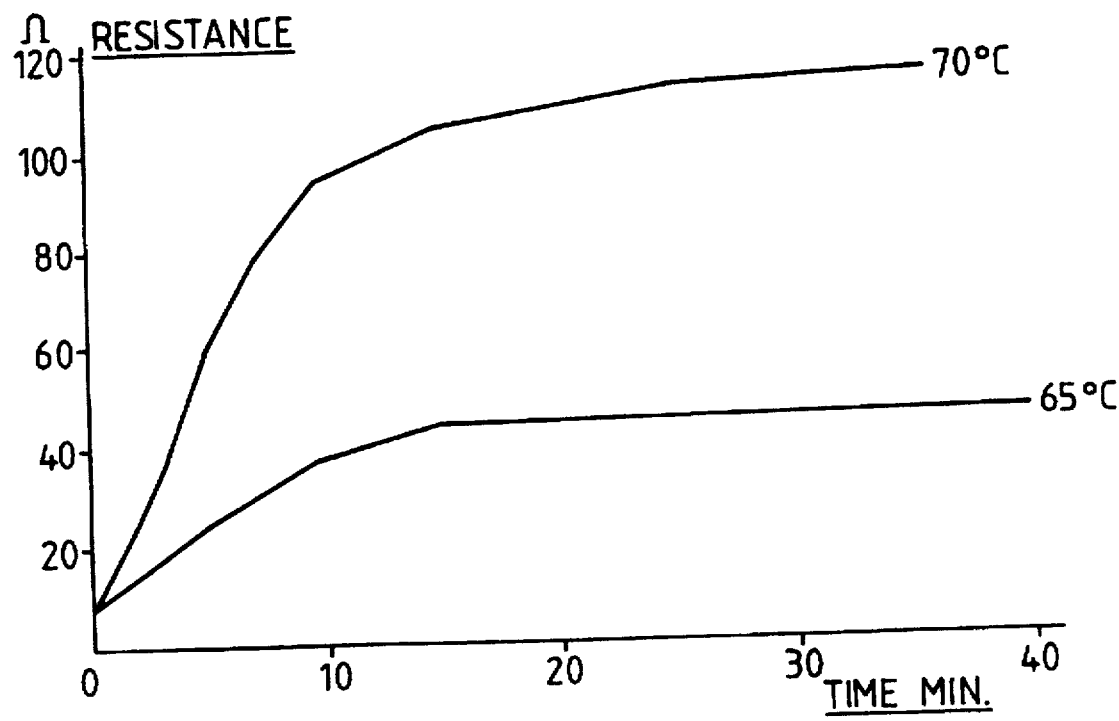
Figure 4:
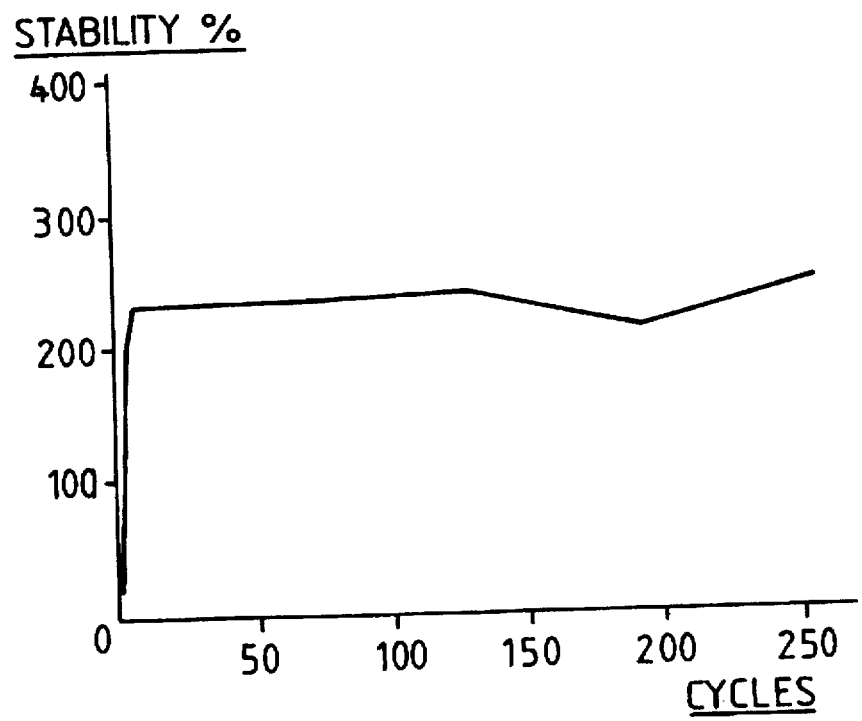

Other electrical properties of compositions according to the invention are illustrated by the accompanying drawings in which:

FIG. 1 shows graphs of surface resistance against temperature for identically shaped specimens formed from a conventional conductive polymer composition (i.e. a composition utilizing a single carbon black) and for a conductive polymer composition according to the invention, FIG. 2 is a series of graphs of positive temperature coefficient factor against temperature for identical specimens of the compositions identified in Table 3 as Examples 7 to 12, FIG. 3 shows graphs of resistance against time for identically shaped specimens or the composition identified in Table 3 as Example 8, the specimens being maintained at two temperatures, and FIG. 4 is a graph of stability of resistance over a number of switching cycles of 6 minutes conducting at 15 volts and 18 minutes not conducting for a specimen of another composition, comprising ethylene vinyl acetate 52% and carbon blacks reference 1 and reference 2, as described in Table 1, each 24%, by weight, the specimen being maintained at 23° C.

Graph A in FIG. 1 compares the surface resistance with temperature for a specimen formed from a conventional conductive polymer composition comprising 60 percent by weight of EVA copolymer 1 mixed with 40 percent by weight of conductive carbon black reference 1 (see Table 1). Graph B shows the same comparison for an identically shaped specimen formed from the composition identified in Table 2 as Example 1, comprising the same polymer with 20 percent by weight of each of conductive carbon blacks references 1 and 2. It can be seen that the resistance of Example 1 increases much more rapidly with increasing temperature than that of the conventional conductive polymer composition.

FIG. 2 shows six graphs, of positive temperature coefficient factor against temperature in degrees Celsius, for the compositions identified in Table 3 as Examples 7 to 12.

FIG. 3 shows two graphs, of resistance in ohms against time in minutes, of two specimens of the composition Example 8 maintained at temperatures of 65° and 70° C. respectively. Both samples were first annealed for a period of about twenty minutes, after which the resistance became substantially constant. This shows the possibility of control by temperature of devices manufactured from conductive polymer compositions according to the invention.

In a subsequent extended test, in which each specimen, after the initial annealing period, was monitored through 100 cycles of 6 minutes conducting at 15 volts end 18 minutes recovery, the resistance of the specimen stored at 65° C. increased from its initial resistance of 40 ohms to 50 ohms and the resistance of the specimen stored at 70° C. decreased from its initial resistance of 100 ohms to 90 ohms.

FIG. 4 shows how the resistance of a specimen of the composition mentioned above remained substantially constant throughout over 250 cycles of conduction end recovery. The graph shows measured resistance as a percentage of the original resistance of the specimen before annealing, plotted against the number of cycles of conduction and recovery. The specimen was first annealed at 23° C. whilst conducting until the initial increase in resistance appeared to cease, as indicated by the initial steep part of the graph. It was then switched off for the first recovery period, after which the cycles were repeated as mentioned. There was little further change in resistance.

What is claimed is:

1. A conductive polymer composition, having positive temperature coefficient characteristics, comprising:

at least one thermoplastic polymer having a matrix wherein a mixture of electrically conductive carbon blacks is dispersed, the polymer matrix constituting between about 20 and about 98 percent, by weight, of the composition and the mixture constituting between about 2 and about 80 percent, by weight, of the composition, wherein said mixture includes a first electrically conductive carbon black and a second electrically conductive carbon black, each of the carbon blacks having a structure level, as measured by DBP technique, of between about 40 and about 150 cc/100 g, and surface areas not greater than about 230 m$^2$/g, and each constituting between about 1 and about 40 percent, by weight, of the composition, the first carbon black comprising particles having an average size between about 35 and about 300 nm, and the second carbon black comprising particles having an average size between about 15 and about 25 nm.

2. The conductive polymer composition of claim 1, wherein the polymer comprises between about 40 and about 80 percent, by weight, and the mixture of carbon blacks comprises between about 20 and about 60 percent, by weight.

3. The conductive polymer composition of claim 1, wherein the polymer comprises between about 52 and about 72 percent by weight and the mixture of carbon blacks comprises between about 28 and about 48 percent, by weight.

4. The conductive polymer composition of claim 1, wherein the first conductive carbon black comprises particles having an average size of approximately 40 nm and the second conductive carbon black comprises particles having an average size of approximately 20 nm.

5. The conductive polymer composition of any of claims 1 to 4, wherein at least one of the carbon blacks is a furnace black.

6. An article of manufacture produced from the conductive polymer composition of claim 1.

7. An electrically-conductive ink, comprising the conductive polymer composition of claim 1, end at least one transient carrier.

* * * * *